(12) United States Patent
Stelle, IV et al.

(10) Patent No.: US 10,715,213 B1
(45) Date of Patent: Jul. 14, 2020

(54) LEAKAGE DETECTION FOR OFDM SYSTEM WITH FIXED PILOT

(71) Applicant: Viavi Solutions, Inc., San Jose, CA (US)

(72) Inventors: Raleigh B. Stelle, IV, Indianapolis, IN (US); John Stewart, Indianapolis, IN (US); Cinna Soltanpur, San Jose, CA (US)

(73) Assignee: VIAVI SOLUTIONS INC., San Jose, CA (US)

( * ) Notice: Subject to any disclaimer, the term of this patent is extended or adjusted under 35 U.S.C. 154(b) by 0 days.

(21) Appl. No.: 16/551,721

(22) Filed: Aug. 27, 2019

(51) Int. Cl.
*H04B 3/46* (2015.01)
*H04L 27/26* (2006.01)
*H04L 5/00* (2006.01)

(52) U.S. Cl.
CPC .............. *H04B 3/46* (2013.01); *H04L 5/001* (2013.01); *H04L 27/2653* (2013.01); *H04L 27/2607* (2013.01)

(58) Field of Classification Search
CPC ....... H04B 3/46; H04B 17/309; H04B 17/354
See application file for complete search history.

(56) References Cited

U.S. PATENT DOCUMENTS 9,374,291 B2 6/2016 Murphy
2019/0140692 A1* 5/2019 Sun .......................... H04B 3/46

OTHER PUBLICATIONS

CableLabs, "Data-Over-Cable Service Interface Specifications DOCSIS® 3.1, Cable Modem Operations Support System Interface Specification," pp. 1-306 (Apr. 22, 2019).

* cited by examiner

*Primary Examiner* — Kevin Kim
(74) *Attorney, Agent, or Firm* — DLA Piper LLP (US)

(57) ABSTRACT

Cable network test instruments are disclosed. The test instruments are configured to collect signal data across a frequency band and analyze the collected data to determine whether orthogonal frequency division multiplexing (OFDM) signal leakage is present. Methods of identifying OFDM signal leakage are also disclosed.

20 Claims, 5 Drawing Sheets

LEAKAGE DETECTION FOR OFDM SYSTEM WITH FIXED PILOT

TECHNICAL FIELD

The present disclosure relates, generally, to digital signal analysis and, more particularly, to instruments and methods for interrogating a received signal to identify and distinguish it from other signals.

BACKGROUND

Most cable network systems are coaxial-based broadband access systems that may take the form of all-coax network systems, hybrid fiber coax (HFC) network systems, or RF over glass (RFOG) network systems. Cable network system designs, including, for example, cable television (CATV) network system designs, typically use a tree-and-branch architecture that permits bi-directional data transmission, including Internet Protocol (IP) traffic between the cable system head-end and customer locations. There is a forward or downstream signal path (from the cable system head-end to the customer location) and a return or upstream signal path (from the customer location back to the cable system head-end). The upstream and the downstream signals occupy separate frequency bands. In the United States, the frequency range of the upstream band is from 5 MHz to 42 MHz, 5 MHz to 65 MHz, 5 MHz to 85 MHz, or 5 MHz to 200 MHz, while the downstream frequency band is positioned in a range above the upstream frequency band.

Customer locations may include, for example, cable network subscriber's premises. Typical signals coming from a subscriber's premises include, for example, set top box DVR/On Demand requests, test equipment data channels, and Internet Protocol output cable modem carriers defined by the Data Over Cable Service Interface Specification ("DOCSIS"), which is one communication standard for bidirectional data transport over a cable network system.

Signal leakage (egress noise, RF emissions, and so on) may occur due to faulty cabling, insufficient shielding, incomplete connections, faulty or worn connectors, during application of certain digital signal processing techniques, and due to other reasons. Signal leakage may be both wasteful to the cable network operators and may interfere with transmission of other signals and operation of nearby devices or networks.

SUMMARY

A cable network test instrument includes an antenna connected to an RF transceiver, and a controller electrically connected to the RF transceiver and being configured to access data on a frequency range being scanned by the antenna. The controller includes circuitry that is configured to: isolate a plurality of sets of subcarriers from the collected signal data, each of the plurality of sets including subcarriers associated with each one of frequency bins of the predefined frequency range, add the subcarriers of the plurality of sets based on the frequency bin associated therewith, and determine, based on a ratio of power of the added subcarriers of the frequency bins, whether a leakage of an orthogonal frequency-division multiplexing (OFDM)-based signal is present.

A method for identifying a leakage of an orthogonal frequency-division multiplexing (OFDM)-based signal is described. The method includes operating a test instrument to scan a predefined frequency range to collect signal data, isolating, with the test instrument, a plurality of sets of subcarriers from the collected signal data, each of the plurality of sets including subcarriers associated with center frequencies of the predefined frequency range, operating the test instrument to add the subcarriers of the plurality of sets based on the frequency bin associated therewith, and determining, based on a ratio of power of the added subcarriers of the frequency bins, whether a leakage of the OFDM-based signal is present.

A cable network test instrument includes an input unit configured to receive a command to begin scanning a predetermined frequency range, and a controller electrically connected to the input unit, the controller being configured to detect signals present on the scanned frequency range. The controller includes circuitry that is configured to: sample a first portion of the detected signal and store the samples as a first set, skip a second portion of the signal data, sample a third portion of the signal data and store the samples as a second set, add the samples of the first set to the samples of the second set and store as a combined set, and identify leakage of an orthogonal frequency-division multiplexing (OFDM)-based signal and generate a corresponding display notification in response to a power ratio between portions of the combined set being greater than a threshold.

BRIEF DESCRIPTION OF THE DRAWINGS

The detailed description particularly refers to the following figures, in which.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Leakage of signal during signal transmission may be costly, may cause interference or result in non-compliance of the transmission equipment with regulatory standards. A device used for detecting leakage of a signal from a cable network using orthogonal frequency division multiplexing (OFDM) may include an antenna, a radio frequency (RF)

module, an analog-to-digital (A/D) converter, a digital signal processing (DSP) unit, a display, and an input interface.

Figure 1:
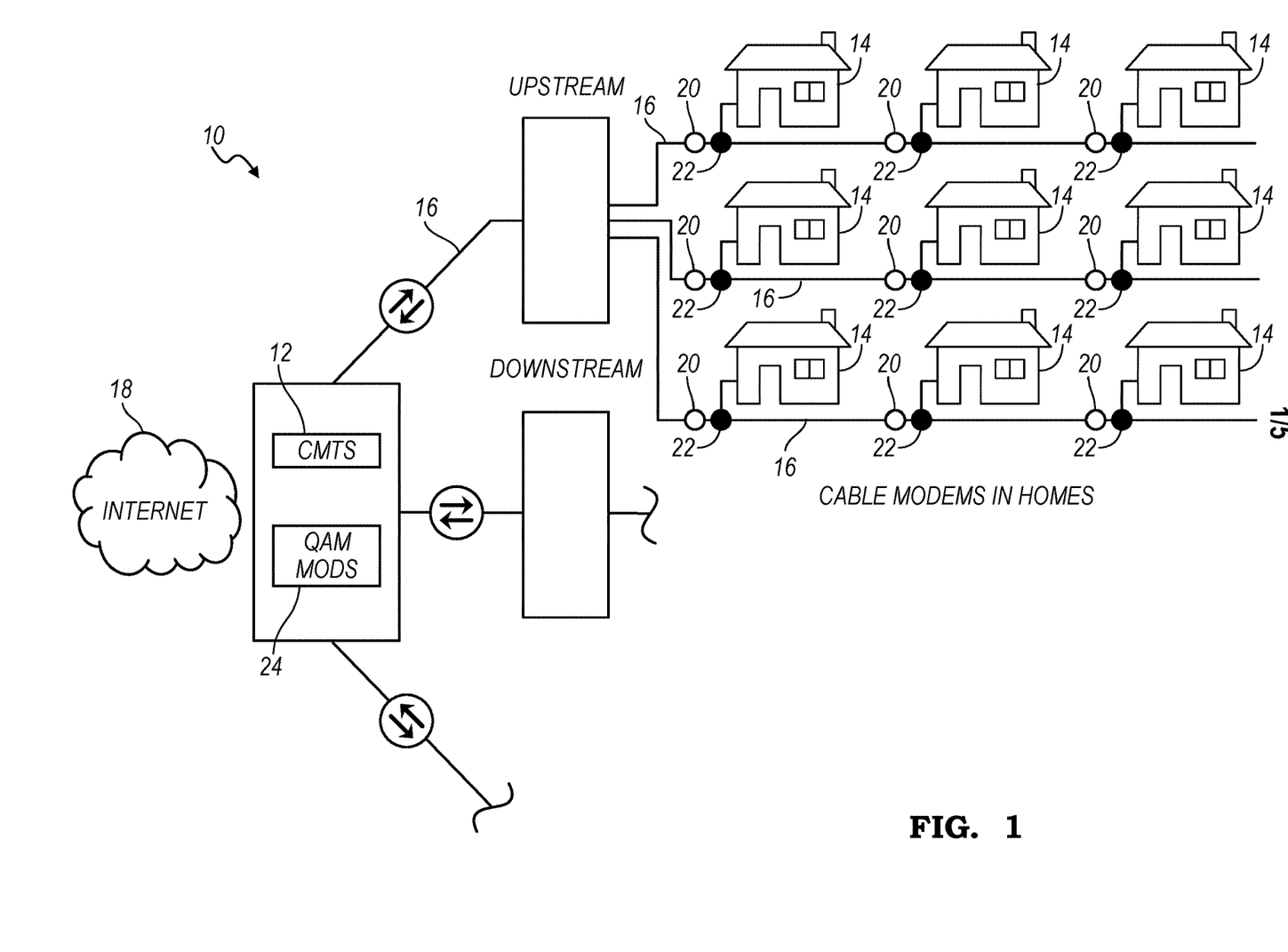
FIG. 1 is a diagram of a cable network system.

FIG. 1 illustrates an example cable network system 10 for delivering network content to a plurality of end users, e.g., subscribers. The system 10 may include a Cable Modem Termination System (hereinafter, CMTS) 12 that may be located at a cable company's head end or local office. The CMTS 12 obtains and modulates programming material onto appropriate carrier signals for distribution to cable modems 14 located at subscribers' premises, such as offices, homes, apartments, or other spaces at which network content is desired. In one example, the CMTS 12 may modulate the network content data stream using OFDM, a digital modulation scheme that includes transmitting multiple carriers (called subcarriers) in parallel within a given frequency channel. The OFDM subcarriers may be closely spaced and may be orthogonal to one another. The CMTS 12 may further combine the batches of OFDM subcarriers for distribution downstream to subscribers over the forward path. Signals going upstream from subscribers' premises are routed in the return path.

The CMTS 12 is connected to the cable modems 14 via a plurality of data lines 16 such as, for example, coaxial cable and/or optical fiber that transport the cable network signals. In some embodiments, the cable network signals are transported as radio frequencies (RF). The signals may also be transported in hybrid systems including optical transmission portions in which the RF signals are converted to light for fiber optic transmission over some portions of the signal path and as RF signals over other portions of the signal path. The CMTS 12 also communicates with the other components of the cable network system 10 via the Internet 18. To do so, the CMTS 12 is configured to convert signals it receives from each cable modem 14 into Internet Protocol (IP) packets, which are then transmitted over the Internet 18. Transmissions from the cable modems 14 to the CMTS 12 are referred to as "upstream" transmissions or signals. The CMTS 12 is also configured to send signals "downstream" to the cable modems 14 by processing the signals it receives via the Internet 18 and then transmitting them to the cable modems 14.

The cable network system 10 also includes a number of nodes 20, 22. The nodes include a number of amplifiers 20 that are positioned throughout the cable network system 10 to compensate for signal loss caused by, for example, imperfections in the data lines or splitting of the signal during distribution. The cable network system 10 also includes a plurality of distribution taps 22 that provide points at which the subscribers' premises (and hence the cable modems 14) may be connected. In the illustrative embodiment, a single distribution tap 22 is connected to a single subscriber's premises via a coaxial cable. It should be appreciated that in other embodiments one or more of the taps may split the signals for distribution into two, four, or eight subscribers' premises. It should also be appreciated that a single node may include both an amplifier and a distribution tap.

The cable network system 10 may include any number of "upstream" and "downstream" channels and carriers within each channel to carry data over the data lines 16 between the CMTS 12 and the cable modems 14 on the system 10. Currently, cable network systems provide either four or eight active upstream channels in the upstream frequency band. In some embodiments, there may be as many as 8192 upstream channels.

Regulatory agencies and industry best practices of signal transmission may limit the amount of spectral leakage (e.g., egress noise, RF emissions) that may be emitted from upstream and downstream signal transmission bands. Signal leakage may create interference with other communication devices, as well as, be costly and wasteful to the cable network service provider. Cable network operators seek to identify and eliminate signal leakage to reduce the possibility of interference and improve the operation of the cable network system 10.

The use of OFDM allows the CMTS 12 to increase spectral efficiency while minimizing possibility of interference among the several OFDM subcarriers. For example, in the frequency domain, the CMTS 12 may convert each to-be-transmitted subcarrier into a sinc function spectrum. The CMTS 12 prevents interference between the overlapping spectra by distributing the functions among orthogonally-spaced frequencies, such that individual peaks of each subcarrier sinusoidal waveform line up with nulls of the waveforms of the other subcarriers.

On the other hand, a transmission frequency error may cause the OFDM subcarrier frequencies to shift such that the spectral nulls are no longer aligned. Such loss of orthogonality among the OFDM subcarrier sinusoids may result in inter-subcarrier interference.

To implement frequency domain conversion prior to the OFDM-based signal transmission, the CMTS 12 may modulate each subcarrier with complex data using a digital modulation scheme, such as, but not limited to, Binary Phase-Shift Keying (BPSK), Quadrature Phase-Shift Keying (QPSK), Quadrature Amplitude Modulation (QAM), and so on. In one example, the CMTS 12 may be configured to map each subcarrier to a corresponding source data symbol to convert the subcarrier into a complex number (I+jQ) representing a mapped point on a constellation diagram.

The CMTS 12 may provide (input) the complex source symbols to an inverse fast Fourier transform (IFFT) block configured to transform the data into the time domain. Accordingly, the IFFT block of the CMTS 12 converts the frequency domain subcarriers into an OFDM symbol in the time domain.

In one example, the IFFT block takes in n source symbols at a time, where n is the number of subcarriers in the system. Each of these n input symbols has a symbol period of T seconds. Thus, the IFFT block outputs n orthogonal sinusoids, each of which has a different frequency.

Accordingly, during an OFDM transmission, the CMTS 12 may update the output at a periodic interval T that forms the symbol period. To maintain orthogonality, symbol period T must be the reciprocal of the subcarrier spacing. The symbol duration time $T_s$ can be calculated using Equation (1), such that:

$$T_s = 1/f_s, \tag{1}$$

where $f_s$ is the symbol rate. In one example, the symbol rate, also known as either baud rate or modulation rate, may be indicative of a number of symbol changes, waveform changes, or signaling events, across the transmission medium per time unit. In some instances, the symbol rate is measured in baud (Bd) or symbols per second and is related to a gross bitrate expressed in bits per second. The receiver of the system 10 may reverse the pre-transmission process completed by the CMTS 12 by using the same frequencies to recover the original data stream. An FFT block of the receiver may be configured to convert the OFDM symbols for processing in the frequency domain and so on.

Moreover, during the time domain processing, the CMTS 12 of the headend may be configured to insert guard intervals between each of the OFDM symbols. The guard intervals insertion process is described below in further detail. The CMTS 12 may be configured to concatenate several OFDM symbols to create the final OFDM burst signal. Thus, OFDM burst type carrier signal is the sum of one or more OFDM symbols, wherein each symbol includes a predefined number of orthogonal subcarriers.

To form guard intervals between the OFDM symbols, the CMTS 12 of the headend may be configured to add one or more pilot subcarriers to the signal. In one example, the CMTS 12 may be configured to add several pilot subcarriers at a beginning of the OFDM symbol and add an identical set of subcarriers at an end of the OFDM symbol. In this way, the pilot subcarriers form a cyclic prefix of the OFDM transmission by providing a buffer region between OFDM symbols to prevent inter-symbol interference and by enabling modeling of the linear convolution of a frequency-selective multipath channel as a circular convolution that, in turn, may be transformed to the frequency domain via a discrete Fourier transform (DFT), an approach that simplifies frequency domain processing, such as channel estimation and equalization.

Put another way, the cyclic prefix (expressed as a cluster of pilot subcarriers) is created so that each OFDM symbol is preceded by a copy of the end part of that same symbol. The OFDM cyclic prefixes may be applied in different lengths in various systems. Meaning, for different applications, clusters of pilot subcarriers may differ in the numbers of pilot signals they contain.

Accordingly, when performing data transmission using OFDM, the CMTS of the headend adds a predefined number of pilot subcarriers to the signal. For example, when loading n bins of the IFFT block, the CMTS may ensure that n−4 bins contain the constellation points which are mapped into frequency offset indexes ranging from −(n−4)/2 to +(n−4)/2 and that the remaining 4 bins may be pilot and zero bins.

The pilot subcarriers may be inserted into predefined frequency offset index locations, such as frequency bins −21, −7, +7, and +21 of a 52-bin OFDM symbol. In some instances, the zero bin is a null (or DC) subcarrier and is not used, containing a 0 value (0+j0). The index locations (frequency bins) of the pilot subcarriers may be fixed relative to a known location of Physical Layer (PHY) Link Channel (PLC) subcarriers for a predefined number of symbol transmissions, where PLC may be defined as a narrowband signaling channel located within the downstream OFDM channel.

In one example, a cable modem may acquire location of the PLC within the OFDM channel during an acquisition process of a complete OFDM channel. Indeed, the cable modem may be configured to determine the complete OFDM channel based on channel parameters derived from the PLC. Referred to as "blind" PLC acquisition, a cable modem may rely on a predefined fixed frame structure of PLC, e.g., 128 symbols and 8 or 16 subcarriers, where each PLC frame includes a preamble of 8 symbols and 120 data symbols. The PLC preamble may be BPSK-modulated and data symbols of the PLC may be modulated in 16-QAM, protected with a robust low-density parity-check code (LDPC) forward error correction (FEC) and block interleaver. In some instances, the PLC subcarriers may be located at a center of a given 6-MHz portion of active frequency range. The PLC subcarriers may carry information about a downstream PHY layer, such as, but not limited to, a timestamp, energy management, a trigger message for synchronizing an event between the CMTS and a cable modem, and a message channel for bringing new cable modems online.

The receiver scanning predefined frequency bands may be configured to detect an OFDM signal leakage by identifying, through signal accumulation, a presence of one or more clusters of the pilot subcarriers. Thus, the test instrument need not have prior knowledge of incoming PLC messages to detect OFDM signal leakage. In some instances, the test instrument may have prior knowledge of a location of the PLC subcarriers within a given carrier wave. Further, by accumulating signal data over several symbols, the test instrument may detect and identify OFDM signal leakage even if magnitude of the signal is below a predefined threshold, i.e., during low signal-to-noise ratio (SNR) transmission conditions.

Figure 2A:
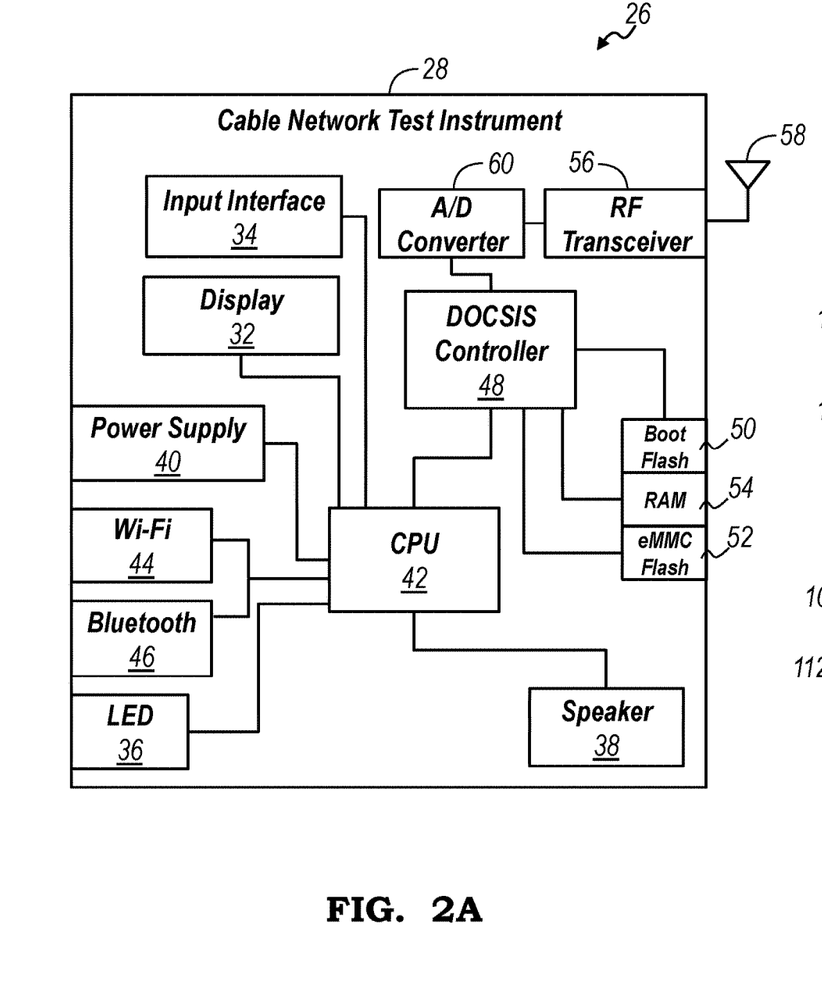
FIG. 2A is a simplified block diagram of a test instrument configured to identify OFDM signal leakage in the cable network system of FIG. 1.

FIG. 2A illustrates an example test instrument 26 for use in identifying signal leakage in the transmission band of the cable network system 10. Signal leakage may be portions of a transmitted signal that are detected and identified outside a dedicated transmission medium of that signal, such as a network cable, or outside a frequency band specifically set aside for transmission of the signal. In the illustrative embodiment, the test instrument 26 includes an outer case 28 that houses electronic circuitry 30 configured to collect and process signal data from around the cable network system 10. The test instrument 26 has a user interface that includes an integrated display 32, an input interface 34, e.g., keyboard, visual indicators (e.g., light-emitting diodes) 36 associated with different functions of the test instrument 26, and a speaker 38. In the illustrative embodiment, the integrated display 32 is a liquid crystal display. In some instances, the display 32 and the input interface 34 may be integrated with one another, such that the resulting integrated interface is configured to receive user input, e.g., as a touch screen.

The test instrument 26 also includes a power supply 40 configured to power to the other electronic circuitry 30. The power supply 40 may include a rechargeable battery pack mounted in the case 28 and/or circuitry for connecting the test instrument 26 to a standard wall outlet.

The test instrument 26 also includes a central processing unit (CPU) or controller 42, which is operable to selectively control the other electronic circuitry 30 of the test instrument 26. In the illustrative embodiment, the CPU 42 is a microprocessor configured to boot or power-up the circuitry required to collect and analyze signal data from the vicinity of the system 10. It should be appreciated that in other embodiments the CPU 42 may take the form of a field programmable gate array (FPGA) or other electronic device configured to control the operation of the circuitry 30.

In the illustrative embodiment, the CPU 42 is connected to the input interface 34 to receive inputs from the technician and to the display 32 and indicators 36 to provide outputs and other information to the technician regarding the operation of the test instrument 26 and, for example, the data acquired during testing. Any measurements or other data collected by the test instrument 26 may be transmitted to a monitoring system via a Wi-Fi transceiver 44 that is connected to the CPU 42. As shown in FIG. 2, the test instrument 26 includes a transceiver 46 operable to transmit and receive signals from a mobile device via the Bluetooth communication protocol.

It should be noted that the CPU 42 may operate on its own or in conjunction with one or more controllers 48 connected thereto. In the illustrative embodiment, the controller 48 may be a microprocessor such as, for example, a Puma 7 chip, which is commercially available from Intel Corporation, and may be configured to operate according to DOCSIS 3.1 operating standard. It should be appreciated that in other embodiments the controller may take the form of a field programmable gate array (FPGA) or other electronic device configured to process signals detected in the vicinity of the system 10.

In the illustrative embodiment, the CPU 42 and the controller 48 constitute the main electronic controllers of the instrument 26 to operate the other circuitry 30 to collect and analyze data detected in the frequency spectrum vicinity of the system 10. The test instrument 26 also includes in the illustrative embodiment a flash memory 50 for booting the controller (e.g., microprocessor) and flash memory 52 and RAM memory 54 to support other operations of the test instrument 26. The flash memory 52 is illustratively eMMC, and the RAM memory 54 is illustratively DDR3.

An RF transceiver 56 of the test instrument 26 is connected to an antenna 58 and is configured to detect signals within one or more predefined frequency ranges. As described above, one OFDM symbol may include one or several bits of information, e.g., one symbol may carry more than ten bits and so on. Conveying more than one bit per symbol may reduce the time required to send a given quantity of data over a limited bandwidth and may increase spectral efficiency in (bit/s)/Hz, i.e., a high bit rate in bit/s although the bandwidth in hertz may be low. The maximum baud rate for a passband for common modulation methods such as QAM, PSK and OFDM is approximately equal to the passband bandwidth.

The RF transceiver 56 of the test instrument 26 outputs a signal to an A/D converter 60 operable to convert the analog radio frequency signals received via the RF transceiver 56 to digital signals for use by the controller 48. To do so, the A/D converter 60 is configured to tune the analog radio frequency signals and implement automatic gain control of those signals. The A/D converter 60 also selects the channel and performs related functions to make individual QAM signals detected within certain frequency channels in the vicinity of the cable network system 10 available for further processing.

The output of the A/D converter 60 is provided to the controller 48 for further processing. In this way, the controller 48 may be configured to operate the A/D converter 60, the RF transceiver 56, and the antenna 58 to issue a command to sweep one or more frequency ranges to detect signals transmitted therein. The controller 48 may detect a leakage of an OFDM signal by identifying, from among the detected signals, an OFDM-encoded signal. In one example, the controller 48 may be configured to identify the OFDM-encoded signal by comparing a predefined pattern of pilot subcarriers to a profile of the signal detected by the antenna 58 and the RF transceiver 56 in the vicinity of the system 10. In some instances, the signal detected during a frequency sweep by the test instrument 26 may have a high SNR. To that end, the controller 48 may be configured to accumulate and analyze several consecutive batches of OFDM symbols prior to discerning the pilot subcarrier profile over the data subcarriers surrounding it.

Figure 2B:
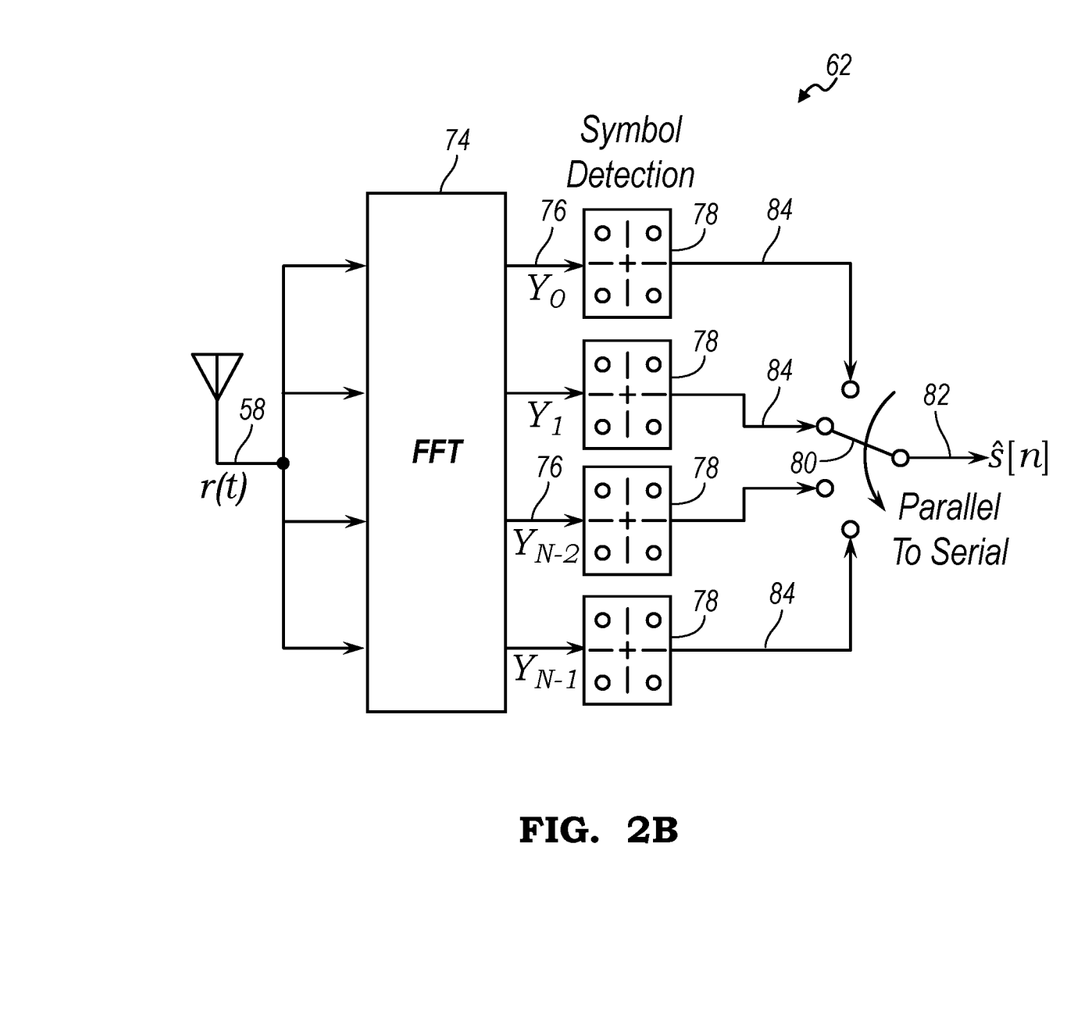
FIG. 2B is an exemplary diagram of a processing system of the test instrument of FIG. 2A.

FIG. 2B illustrates an example implementation 62 of the operations of the controller 48 that identifies leakage of an OFDM-encoded signal. After receiving the signal through RF path, the test instrument 26 may be configured to filter a fixed bandwidth around PLC, e.g., 6 MHz, using a bandpass filter to isolate the OFDM bandwidth of interest. Accordingly, the controller 48 may be configured to provide the resulting baseband signal to the FFT block 74. In some instances, the FFT block 74 may be a predefined fixed size that is larger than a size of the OFDM symbol, e.g., 1024-bit FFT block. At the output of the FFT block 74, each of the selected indices 76 are isolated and provided to a corresponding one of accumulators 78.

The accumulators 78 boost the magnitude of the pilot subcarriers by adding them over time where transmitted symbol repeats itself from one symbol to the next. To that end, phase and quadrature components of the pilot subcarriers may remain in phase with one another, such that signal profile accumulation may be achieved. In one example, the controller 48 may be configured to collect a predefined number of signal samples. In another example, the controller 48 may operate the FFT block 74 to skip a plurality of data samples per FFT operation to keep any detected pilot subcarriers in phase with one another. The number of skipped samples may be determined by a size, e.g., length, of the cyclic prefix used in a target system.

Total of 16 subcarriers are identified from a given FFT block 74. This accounts for eight pilot subcarriers. The remaining eight indices out of the FFT block 74 are assigned to data subcarriers located between the indices occupied by the pilot subcarriers. Since the data is modulated and assumed to be chosen from zero mean distribution, the average output power of accumulator 78 is regarded as negligible compared to that of the pilot subcarriers.

Figure 2C:
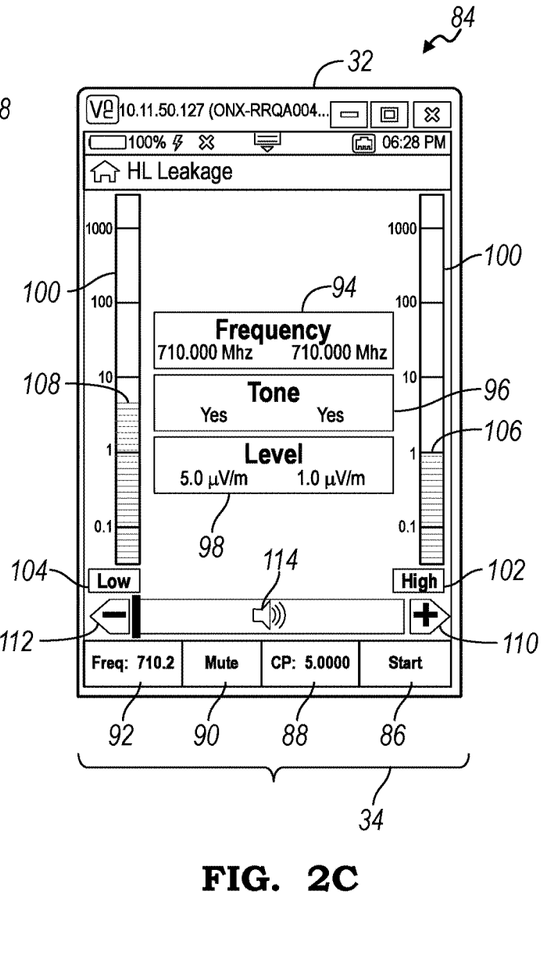
FIG. 2C is an exemplary diagram of a display and input interface of the test instrument of FIGS. 2A and 2B.

After accumulating these 16 subcarriers over multiple OFDM symbols (20×4 symbols), the accumulators output 78 the signal profile to an analyzer 80. In this block, we add the magnitude of pilot subcarriers and data subcarriers. The test instrument 26, as shown in FIG. 2C, may display the resulting ratio between the "highs" (peaks) of pilot subcarriers against the "lows" (troughs) of data subcarriers received from the accumulators. This ratio in logarithmic scale along with the observed energy is passed to the screen. In some instances, one or more safeguards are added in the algorithm to ensure that troughs of the sinc function are evenly distributed between pilot subcarriers.

The indices that belong to pilots may be separated and accumulated over multiple OFDM symbols. Choosing the right timing, these symbols add up constructively over time to a higher magnitude than adjacent symbols because the pilot symbol does not change from one OFDM symbol to the next. If the pattern that forms through this algorithm matches the OFDM signal, an alert may be sent to the user to indicate the presence of an OFDM source.

The technique described herein relies on indexed locations of the pilot subcarriers to detect the presence of OFDM signal and may, accordingly, be sensitive to frequency offset. According to this methodology, the receiver (e.g., the test instrument 26) and transmitter (the CMTS 12) may operate on different frequencies, one or more techniques may be used to establish an accurate center frequency. In one illustrative embodiment, the RF transceiver 56 of the test instrument 26 may identify the center frequency of the CMTS-encoded OFDM signal using a signal of an external global positioning system (GPS). In another illustrative embodiment, the test instrument 26 may be configured to estimate center frequency offset based on one or more calculations (performed by the CPU 42) and may, subsequently, use the computed offset to compensate for frequency shifts in a particular signal batch. In still another illustrative embodiment, the test instrument 26 may be configured to achieve an approximate synchronization of a center frequency based on a sweep over a small range of frequencies.

The CMTS 12 may rely on OFDM scheme according to DOCSIS 3.1, such that the eight pilot subcarriers around PLC (data) subcarriers have a fixed location relative to the PLC center frequency, i.e., the pilot subcarriers are added in two batches of four at a beginning and an end of a given OFDM symbol. In other embodiments, the technique described herein may be readily applied to discerning OFDM signals having index location for pilot subcarriers within the FFT block that is fixed over time.

Furthermore, the pilot subcarriers are not interleaved in time or frequency. Accordingly, the test instrument 26 may be used to identify OFDM-based signal leakage, among other signals, based on a presence of pilot subcarriers.

FIG. 2C illustrates an exemplary user interface layout 84 of the display 32 and the input interface 34 of the test instrument 26. The user interface 84 may include a button (or a switch) 86 configured to receive user input commanding initiation of a frequency spectrum sweep. To that end, the switch 86 may be connected to the controller 48, such that, in response corresponding user input using the switch 86, the controller 48 causes initiation of scanning of a portion of the frequency spectrum.

The user may enter a cyclic prefix duration, e.g., 5 microseconds (µs), and a frequency center for PLC to be swept, using parameter value fields 88 and 92, respectively. Furthermore, a frequency indicator 94 may display a value indicative of the frequency band being swept. The user may operate frequency adjustment controls 110, 112 to change the frequency band being observed by the test instrument 26.

A tone indicator 96 may display a value indicating whether either or both of the data and pilot subcarriers have been detected. Additionally, following initiation of the frequency band sweep, the user may toggle a volume control 90 to mute and unmute incoming RF tones. The status of the volume control 90 may be displayed by a corresponding indicator 114.

The test instrument 26 may display the resulting ratio between the "highs" (peaks) 102 of pilot subcarriers against the "lows" (troughs) 104 of data subcarriers received from the accumulators 78. These ratios 106, 108 in logarithmic scale 100, along with the observed energy level 98, may be rendered on the display 32.

For the detection of OFDM signal carrier, the test instrument 26 performs a frequency sweep without either a sweep time or a sweep frequency band being fixed. Accordingly, the test instrument 26 may not detect the boundaries of the OFDM symbols. Instead, the test instrument 26 may be configured to keep the two consecutive acquired samples out of the FFT block in phase with one another. For example, with a length of a given cyclic prefix being 5 µs and OFDM symbol duration of 20 µs, the test instrument 26 may collect a first predefined number of samples, e.g., 1024 samples, and provide the collected samples to the FFT block for indexing. The test instrument 26 may, subsequently, skip a second predefined number of samples, e.g., 256 samples, immediately following the first collected batch of 1024 before collecting another batch of 1024 samples. Skipping a correct number of samples may ensure that the new collected buffer of 1024 samples are in phase with the samples that have been buffered immediately prior.

Figure 3:
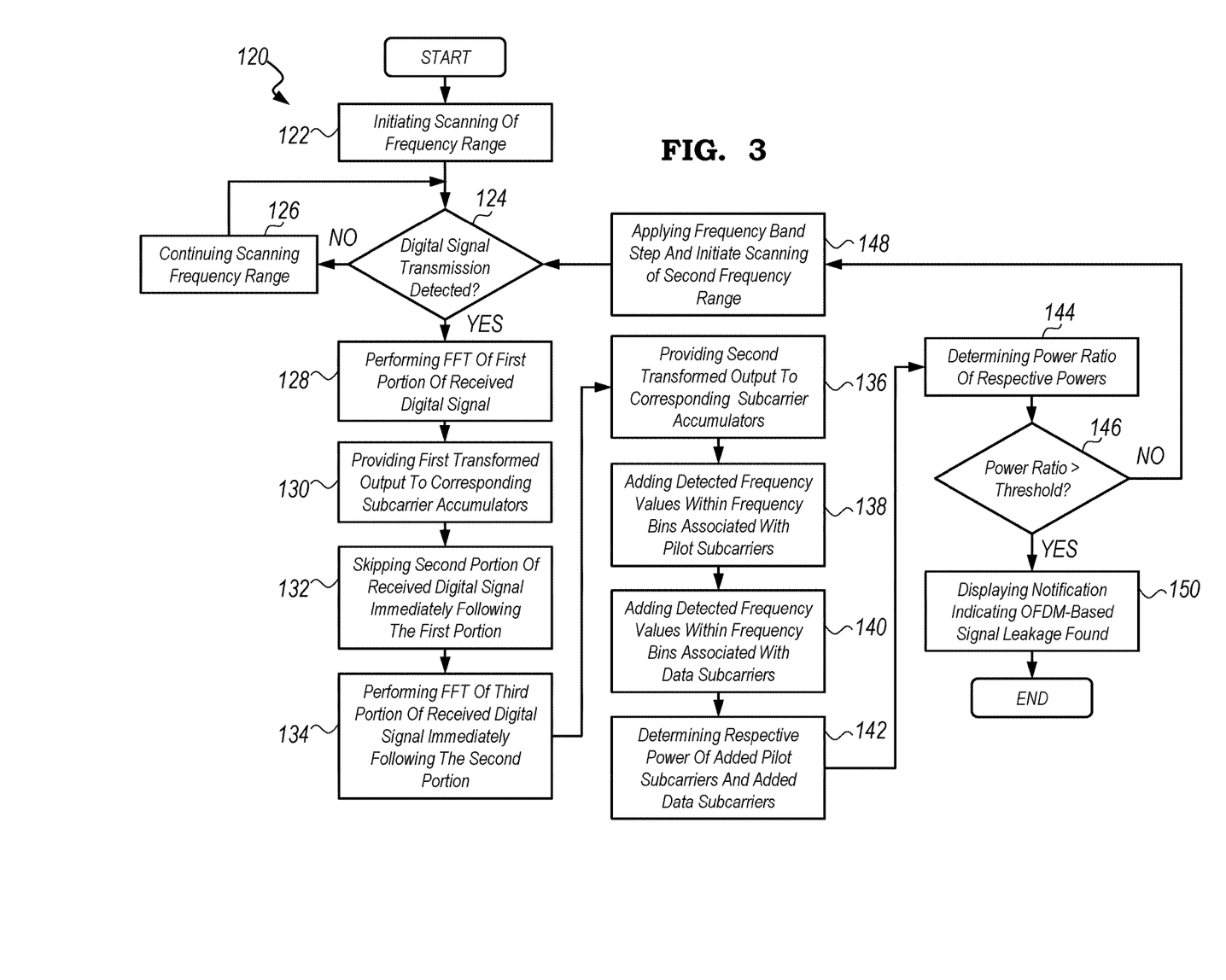
FIG. 3 is an exemplary diagram of a technique for identifying OFDM signal leakage using the test instrument of FIGS. 2A, 2B, and 2C.

FIG. 3 illustrates an exemplary process 120 for identifying leakage of an OFDM-based signal. The process 120 may begin at block 122, where the controller 48 may initiate scanning a predefined range of frequencies. In one example, the controller 48 may initiate the scanning in response to a corresponding user input via the display 32 and/or input interface 34 of the test instrument 26. As described above, the controller 48 may initiate scanning the frequency spectrum using the A/D converter 60, the RF transceiver 56, and the antenna 58. At block 124 the controller 48 may determine whether a digital signal transmission has been detected within the scanned frequency band. In an example, the controller 48 may detect a transmission when the A/D converter 60 outputs to the controller 48 at least one detected symbol. If a digital signal has not been detected, the controller 48 may proceed to block 126 to continue scanning the frequency band. The controller 48 may then determine once more if a digital signal transmission is present.

In response to detecting a digital signal transmission, the controller 48 may, at block 128, perform an FFT transformation on a first portion of the signal. In some instances, the first portion includes a first predefined number of samples of the received signal, e.g., 1024, captured according to a predefined cyclic prefix length, e.g., 5 µs. The transformation may be performed by the FFT block 74 and may include converting the received signal from time domain into frequency domain to isolate any individual subcarriers that may be present.

At block 130, the FFT block 74 may provide each identified subcarrier to a corresponding accumulator 78 associated with a frequency bin of that subcarrier.

At block 132, the controller 48 may skip a second predefined portion, e.g., a second predefined number of samples, of the received signal immediately following the first predefined portion. In some instances, the second predefined number of samples of the received signal, e.g., 256, may have been the samples captured following a completion of a cyclic prefix. Indeed, to the extent the size of the second predefined number of samples is based on a length of a cyclic prefix, the controller 48 may skip the second predefined portion of the received signal by waiting a predetermined period of time. In some instances, the controller 48 may repeat operations of one or more blocks 128, 130, and 132 a predefined number of times, e.g. 20 times.

For instance, a length of a cyclic prefix may determine a total number of samples captured. Accordingly, for a cyclic prefix length of 5 µs may include a first number of samples is 1024, and the second number of samples 256, a combination of the first and second number of samples may correspond to the total number of samples that were captured, e.g., 1280. By capturing and skipping predefined portions of the received signal, the controller 48 may ensure that the receiver, i.e., the test instrument 26, remains in-phase with the transmitter of the signal.

At block 134, the controller 48 performs an FFT transformation on a third predefined portion of the received signal. The third predefined portion may be a portion of the received signal immediately following the second portion of the received signal skipped by the controller 48. In some instances, the third portion includes a third predefined number of samples of the received signal, same or different as one or both of the first and second predefined numbers of samples, captured according to a length of a cyclic prefix of a target system. As one example, the third predefined number of samples may correspond to (be same as) the first predefined number of samples. Additionally or alternatively, the transformation may be performed by the FFT block 74 and may include converting the received signal from time domain into frequency domain to isolate any individual subcarriers that may be present.

At block 136, the FFT block 74 may output each subcarrier identified and isolated from the third portion of the received data to the accumulators 78 associated with a frequency bin of that subcarrier.

The controller 48, at block 138, may add values within frequency bins associated with the pilot subcarriers. At block 140, the controller 48 may add values within frequency bins associated with the data subcarriers. The controller 48 determines, at block 142, respective power values of the combined signals of the pilot subcarrier frequency bins and the combined signals of the data subcarriers frequency bins.

At block 144, the controller 48 determines a ratio between power of the pilot subcarrier frequency bins and power of the data subcarrier frequency bins. The controller 48, at block 146, determines whether the ratio of powers is greater than a threshold. For example, the controller 48 may convert the ratio to a logarithmic scale and may then compare the converted power value to a threshold. If the power ratio does not exceed the threshold, the controller 48 may determine that OFDM-based signal leakage has not been identified and may proceed to block 148 where, following application of a predefined frequency step, the controller 48 may initiate scanning of a next frequency range.

Where the test instrument 26 may run an algorithm for a range of different local oscillator frequencies, a time period for the data acquisition may correspondingly increase. In one example, the test instrument 26 may be configured to keep the acquisition time at less than 100 milliseconds (ms) to ensure a predefined accuracy level of the test instrument 26 in fast-fading and time-varying channels. Accordingly, the test instrument 26 may select a size of the frequency range and/or frequency step sizes according to desired accuracy level and acquisition time.

In response to determining that the power ratio is greater than the threshold, the controller 48, at block 150, may display a notification indicating that an OFDM-based signal leakage has been detected.

Accordingly, frequency offset and/or phase noise may cause in calculations performed by the test instrument 26 to detect an OFDM-based signal leakage to be inaccurate. The offset could be the result of a Doppler effect, lack of synchronization, inaccuracies of the local oscillator at the receiver, or other environmental effects. The test instrument 26 may be configured to compensate digitally for a fixed offset if an estimated fixed offset may be attained. Alternatively, the test instrument 26 may be configured to sweep across a range of frequencies of up to 10-50 kHz, using a fixed step size. Further, changing operating frequency of the local oscillator may ensure that the local oscillator of the test instrument 26 is in sync with the transmitters of the system 10. For example, based on experiments the described method is sensitive up to 50-100 Hz for the aforementioned parameters.

It should be appreciated that the instrument 26 is typically operating at a different timing than the transmitters of the cable network system. As a result, there is possibility of capturing a carrier mid-way through transmission, which might lead to artifacts that the test instrument 26 might mistake for intermittent noise.

Figure 4:
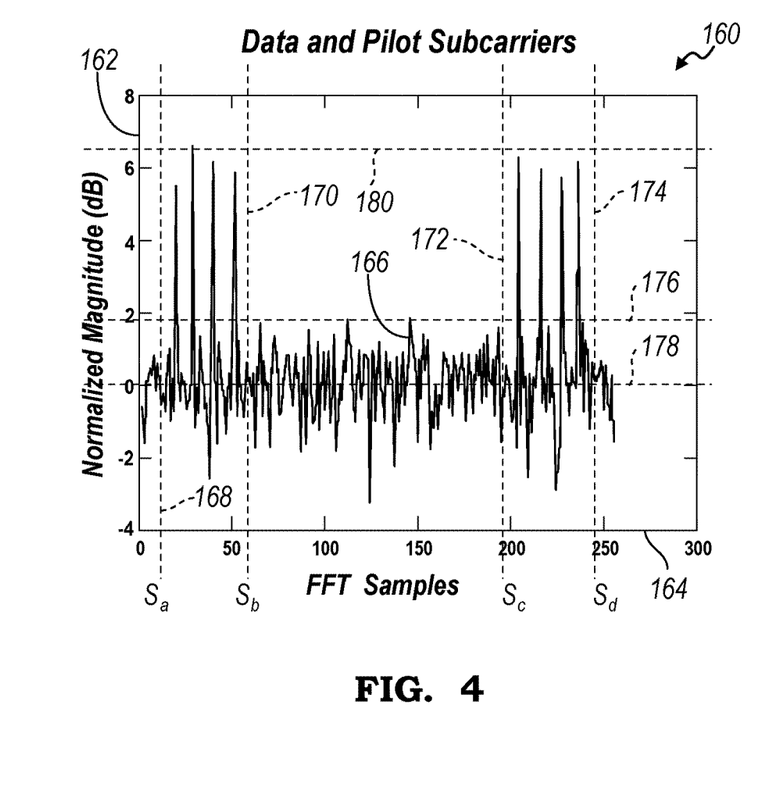
FIG. 4 is an exemplary portion of a signal trace based on data collected and processed using the technique of FIG. 3.

FIG. 4 illustrates a signal trace diagram 160 of an OFDM signal carrier including a predefined number of pilot subcarrier signals within one or more predefined locations with respect to center frequency of the carrier. The diagram 160 includes a vertical axis 162 indicative of a normalized signal magnitude of the OFDM signal and a horizontal axis 164 indicative of a number of FFT samples collected by the test instrument 26.

A signal waveform 166 may be indicative of an OFDM signal detected by the instrument 26, wherein a first set of pilot subcarrier peaks appears between samples S. 168 and samples $S_b$ 170 and a second set of pilot subcarrier peaks appears between samples $S_c$ 172 and samples $S_d$ 174. In one example, the first and second sets of pilot subcarriers may be distributed on both sides of data subcarrier troughs, e.g., signals occurring between the samples $S_b$ 170 and the samples $S_c$ 172, such that position of the pilot subcarriers with respect to the data subcarriers is fixed. As described in reference to at least FIGS. 2A-2C, magnitudes 176 of the data subcarriers (e.g., with respect to a reference level 178) are less than magnitudes 180 of the pilot subcarriers (e.g., with respect to a same reference level 178).

Figure 5:
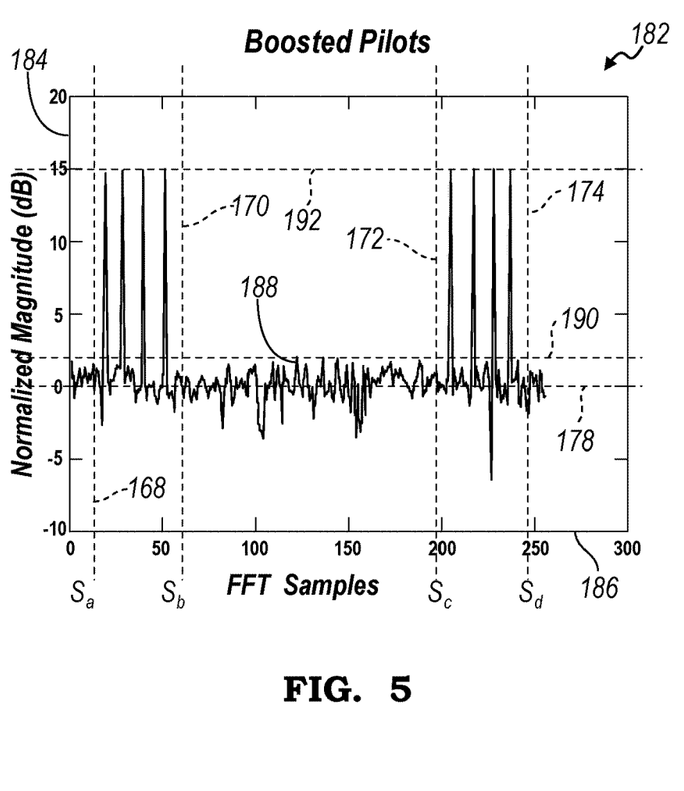
FIG. 5 is an exemplary portion of another signal trace based on data collected and processed using the technique of FIG. 3.

FIG. 5 illustrates an accumulated signal trace diagram 182 of an OFDM signal carrier including a plurality of boosted pilot subcarrier signals within one or more predefined locations with respect to center frequency of the carrier signal. The diagram 182 includes a vertical axis 184 indicative of a normalized signal magnitude of the OFDM signal and a horizontal axis 186 indicative of a number of FFT samples collected by the test instrument 26.

A signal waveform 188 may be indicative of an OFDM signal detected (i.e., using, for example, the process 120 described in reference to FIG. 3) by the instrument 26. The signal waveform 188 may result from signals detected during a given leakage detection frequency sweep and/or by virtue of accumulating signal portions in a plurality of frequency bins associated with pilot subcarriers and data signal subcarriers. In one example, the signal waveform 188 may be indicative of a continuous data collection and accumulation of a signal illustrated by the waveform 166, as described with reference to at least FIG. 4.

In a manner similar to the waveform 166, the signal waveform 188 includes a first set of pilot subcarrier peaks that appears between the samples $S_a$ 168 and the samples $S_b$ 170 and a second set of pilot subcarrier peaks that appears between the samples $S_c$ 172 and the samples $S_d$ 174, such that the first and second sets of pilot subcarriers are disposed on both sides of data subcarrier troughs, e.g., signals occurring between the samples $S_b$ 170 and the samples $S_c$ 172, and/or position of the pilot subcarriers with respect to the data subcarriers is fixed. In response to accumulated data by way of the process 120 described in reference to FIG. 3, corresponding magnitudes 190 of the data subcarriers (e.g., with respect to the reference level 178) of the boosted waveform 188 may be less than the magnitudes 176 of the data carriers of the non-boosted waveform 166. Furthermore, magnitudes 192 of the boosted pilot subcarriers (e.g., with respect to a same reference level 178) may be greater than magnitudes 180 of the non-boosted pilot subcarriers of FIG. 4.

As with the non-boosted waveform 166, magnitudes 190 of the data subcarriers of the boosted waveform 188 are less than magnitudes 192 of the pilot subcarriers of the boosted waveform 188. Additionally, a first difference between the pilot and data subcarrier magnitudes 192, 190 of the boosted signal waveform 188 may be greater than a second difference between the pilot and data subcarrier magnitudes 180, 176 of the non-boosted signal waveform 166.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. A cable network test instrument comprising:
an antenna connected to an RF transceiver, and
a controller electrically connected to the RF transceiver and being configured to access data on a frequency range being scanned by the antenna,
wherein the controller includes circuitry configured to:
isolate a plurality of sets of subcarriers from the collected signal data, each of the plurality of sets including subcarriers associated with each one of frequency bins of the predefined frequency range,
add the subcarriers of the plurality of sets based on the frequency bin associated therewith, and
determine, based on a ratio of power of the added subcarriers of the frequency bins, whether a leakage of an orthogonal frequency-division multiplexing (OFDM)-based signal is present.

2. The cable network test instrument of claim 1, wherein to isolate the plurality of sets of subcarriers from the collected signal data comprises to transform, using a fast Fourier transform (FFT) block, a first set of signal data samples to isolate a first batch of subcarriers therefrom and to transform a second set of signal data samples to isolate a second batch of subcarriers therefrom.

3. The cable network test instrument of claim 2, wherein to add the subcarriers of the plurality of sets based on the frequency bin associated therewith comprises to accumulate, using a plurality of accumulators, values of the subcarriers of each of the frequency bins in the FFT block.

4. The cable network test instrument of claim 1, wherein the ratio of power includes a ratio between power of signals of frequency bins associated with pilot subcarriers and power of signals of frequency bins associated with data subcarriers.

5. The cable network test instrument of claim 4, wherein the frequency bins associated with the data subcarriers are disposed between the frequency bins associated with the pilot subcarriers.

6. The cable network test instrument of claim 1, wherein the circuitry is further configured to determine that the leakage of the OFDM-based signal is present in response to the ratio of power being greater than a threshold.

7. A method for identifying a leakage of an orthogonal frequency-division multiplexing (OFDM)-based signal, the method comprising:
operating a test instrument to scan a predefined frequency range to collect signal data,
isolating, with the test instrument, a plurality of sets of subcarriers from the collected signal data, each of the plurality of sets including subcarriers associated with center frequencies of the predefined frequency range,
operating the test instrument to add the subcarriers of the plurality of sets based on the frequency bin associated therewith, and
determining, based on a ratio of power of the added subcarriers of the frequency bins, whether a leakage of the OFDM-based signal is present.

8. The method of claim 7, wherein isolating the plurality of sets of subcarriers from the collected signal data includes transforming, using a fast Fourier transform (FFT) block, a first set of signal data samples to isolate a first batch of subcarriers therefrom and transforming a second set of signal data samples to isolate a second batch of subcarriers therefrom.

9. The method of claim 8, wherein operating the test instrument to add the subcarriers of the plurality of sets based on the frequency bin associated therewith includes accumulating, using a plurality of accumulators, values of the subcarriers of frequency bins.

10. The method of claim 7, wherein the ratio of power of the added subcarriers of the frequency bins includes a ratio between power of signals of frequency bins associated with pilot subcarriers and power of signals of frequency bins associated with data subcarriers.

11. The method of claim 10, wherein the frequency bins associated with the data subcarriers are disposed between the frequency bins associated with the pilot subcarriers.

12. The method of claim 7, further comprising determining that the leakage of the OFDM-based signal is present in response to the ratio of power being greater than a threshold.

13. The method of claim 12, further comprising displaying a notification alert indicating that leakage of the OFDM-based signal is present in response to the ratio of power being greater than a threshold.

14. A cable network test instrument comprising:
an input unit configured to receive a command to begin scanning a predetermined frequency range, and
a controller electrically connected to the input unit, the controller being configured to detect signals present on the scanned frequency range,
wherein the controller includes circuitry configured to:
sample a first portion of the detected signal and store the samples as a first set,
skip a second portion of the signal data,
sample a third portion of the signal data and store the samples as a second set,
add the samples of the first set to the samples of the second set and store as a combined set, and
identify leakage of an orthogonal frequency-division multiplexing (OFDM)-based signal and generate a corresponding display notification in response to a power ratio between portions of the combined set being greater than a threshold.

15. The cable network test instrument of claim 14, wherein the samples of the first set and the samples of the second set are subcarriers, and the portions of the combined set comprise a first portion including a plurality of samples associated with frequency bins of pilot subcarriers and a second portion including remaining samples that are associated with frequency bins of data subcarriers.

16. The cable network test instrument of claim 14, wherein the first and second sets include a same number of samples and the samples of the first and second sets are ordered, such that adding the samples of the first set to the samples of the second set includes adding a sample of the first set having an nth position in the first set to a sample of the second set having an nth position in the second set.

17. The cable network test instrument of claim 14, wherein the second portion of the detected signal immediately follows the first portion of the detected signal, and the third portion of the detected signal immediately follows the second portion of the detected signal.

18. The cable network test instrument of claim 14, wherein the second portion of the detected signal immediately follows the first portion of the detected signal, and a combination of the first and second portions of the detected signal is indicative of a total number of samples of the detected signal.

19. The cable network test instrument of claim 14, wherein the circuitry includes:
- an analog-to-digital (A/D) converter arranged to, prior to the sampling, convert the detected signal to a digital signal, and
- a fast Fourier transform (FFT) block configured to transform the digital signal output by the A/D converter from a time domain to a frequency domain.

20. The cable network test instrument of claim 19, further comprising a plurality of accumulators, each accumulator configured to receive one sample of the first set and one sample of the second set.

* * * * *